Nov. 1, 1960      R. J. FRAEBEL      2,958,487
IMPACT ABSORPTION DEVICE
Filed Sept. 10, 1956
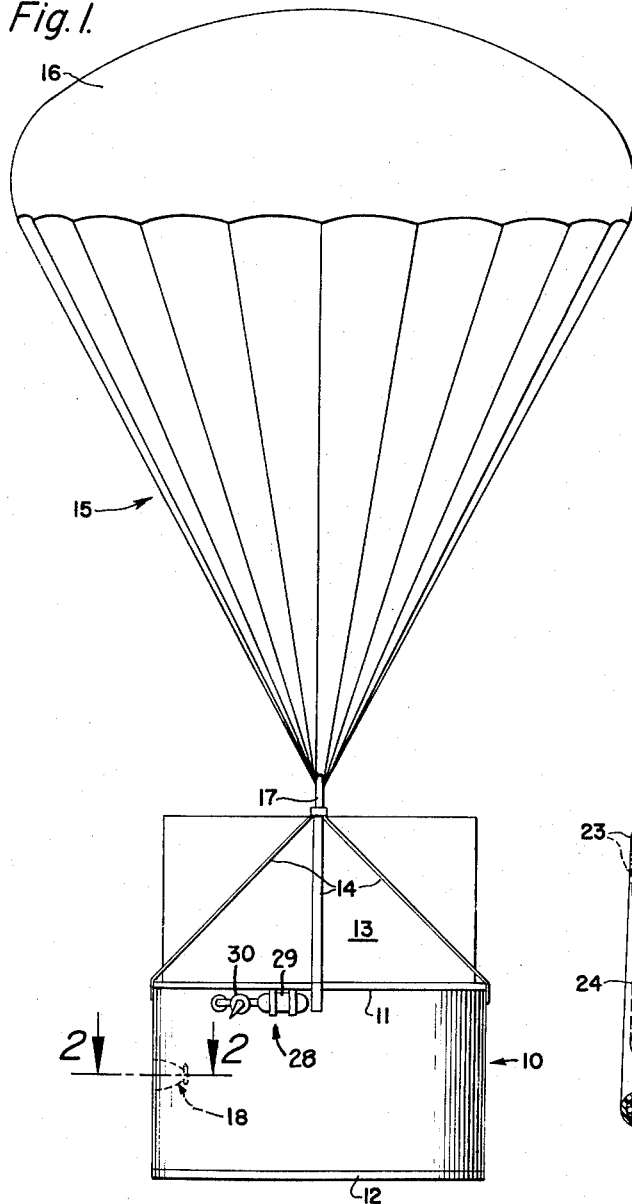
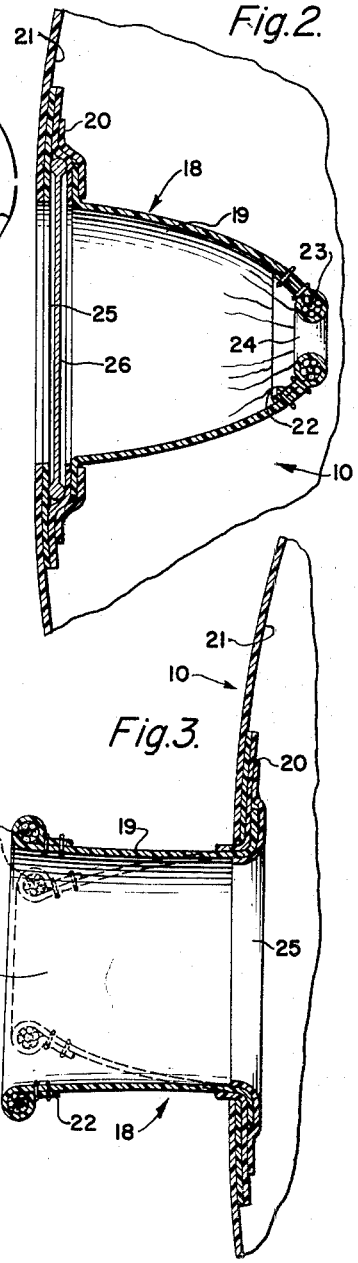
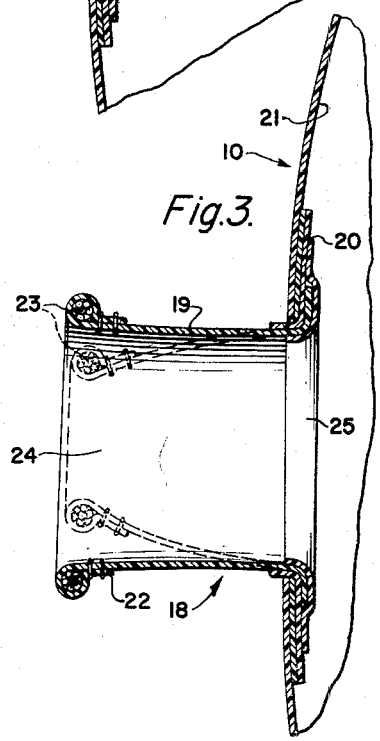
ROBERT J. FRAEBEL,
INVENTOR.
BY United States Patent Office 2,958,487
Patented Nov. 1, 1960

2,958,487
IMPACT ABSORPTION DEVICE
Robert J. Fraebel, Red Bank, N.J., assignor to The Garrett Corporation, Los Angeles, Calif., a corporation of California
Filed Sept. 10, 1956, Ser. No. 608,792
7 Claims. (Cl. 244—138)

This invention relates generally to an impact absorption device and relates more particularly to an impact absorption device for a falling load, such as a missile or a parachute supported load dropped from an aircraft.

While the invention is described and has particular utility for use with a parachute supported load, it is to be understood that its utility is not limited thereto but may be utilized in many other applications, as will be apparent to those skilled in the art.

It is a well-known practice to deliver supplies of all types to a desired destination by carrying the supplies above the point of delivery in an aircraft or other vehicle that travels above the earth's surface and parachuting the supplies to earth. This type of delivery, however, is unsatisfactory because the supplies frequently are damaged due to the impact shock when the load contacts the earth's surface. This is especially true when the supplies include extremely fragile material such as may be found in medical or electronic supplies.

In the past, various means have been devised for preventing undue damage to the supplies when the load contacted the earth's surface. Included in such means were cushioning devices such as pneumatic tubes or bags which were fastened to the underside of the load. However, even with pneumatic tubes or bags fastened to the underside of the load, the supplies were still subjected to severe impact shock and bouncing when the load contacted the earth's surface, and, due to the high compression of the air or gas within the bag, it frequently burst with the consequent loss of cushioning effect just when most required. To prevent the bag from bursting, holes or perforations were formed in the wall of the bag and frangible diaphragms that opened or ruptured when the pressure within the bag was raised to a predetermined value were affixed to the wall of the bag over the hole or perforations. When frangible diaphragms were used, the air within the bag was quickly compressed to a maximum value and then flowed uncontrolled from the bag when the diaphragm ruptured. There was, therefore, no retarding action or control of the air flowing from the bag and the rate of deceleration of the load fluctuated considerably and caused further bouncing and jarring of the load.

Metal spring loaded piston type "g" valves and metal shear pin type flapper valves that opened at a predetermined pressure were also utilized in the wall of the bag, but these valves were heavy and failed to provide the control necessary to sufficiently reduce the undesirable initial impact shock and subsequent bouncing of the load.

It is an object of the present invention to overcome the deficiencies in the prior art devices by providing an impact absorption device for a missile or a parachute supported load comprising a pneumatic bag having means for initiating and regulating the flow of air from the bag when the bag contacts the earth's surface so that the impact shock is reduced to a minimum.

It is a further object of the invention to provide an impact absorption device for a missile or a parachute supported load comprising a pneumatic bag having means for initiating and regulating the flow of air from the bag when the bag contacts the earth's surface so that deceleration of the load is smooth and uniform.

It is a still further object of the invention to provide an impact absorption device for a missile or a parachute supported load comprising a pneumatic bag having novel valve means for controlling and regulating the flow of air from the bag when the bag contacts the earth's surface.

It is a still further object of the invention to provide an impact absorption device for a missile or a parachute supported load that is relatively inexpensive to fabricate, light in weight and sure in operation.

Other and further objects of the present invention will become apparent from the disclosure in the following detailed specification, appended claims, and accompanying drawings wherein:

Fig. 1 is an elevational view of a parachute supported load having an attached pneumatic bag embodying the features of the present invention;

Fig. 2 is a longitudinal sectional view taken on line 2—2 of Fig. 1 showing the position of the valve means during the descent of the load; and Fig. 3 is a view similar to Fig. 2 showing the position of the valve means when controlling and regulating the flow of air from the bag.

Referring to the drawing, there is shown in Fig. 1 an impact absorption device according to the present invention, having an inflatable container or bag 10 intended for use with a parachute supported load. The bag 10 may be fabricated of any suitable material and may be affixed by any suitable means to the underside of a platform 11. A buffer or base plate 12 may be similarly affixed to the bottom of the bag 10 to absorb abrasion forces when the bag contacts the earth's surface.

In accordance with the invention, a supply load indicated generally at 13 may be placed upon the platform 11 and be strapped or otherwise attached thereto by fastening means 14. Means to retard the rate of descent of the load, such as a parachute 15 comprising a canopy 16 and a plurality of shroud lines of conventional form which converge and are secured at their lower ends to a common ring 17, is provided for attachment to the fastening means 14. It is to be understood, however, that the platform 11, the base plate 12, and the parachute 15, are not essential to the invention and any one or all of these items may be omitted, if desired, and the bag 10, or a plurality of bags 10, may be secured directly to a load 13, such as a missile. If the platform 11 is omitted, the fastening means 14 for the load 13 may be secured to the bag 10.

As shown in detail in Fig. 2, a valve member indicated generally at 18 is provided to retard, and regulate, the exhaust of the air from the bag 10. The valve 18 comprises a generally cylindrically shaped flexible sleeve 19 fabricated of any suitable material such as fabric or molded rubber and attached at one end 20 to the inner surface 21 of the bag 10 and doubled back and secured to itself at the other end 22 to form a circular enclosure for an elastic band 23. The band 23 may be formed of molded rubber rings or metal springs and normally reduces the circumferential extent of the free end of the sleeve 19 as shown in Fig. 2 to form an orifice 24, but the orifice opening may be enlarged in the manner hereinafter described. An opening 25 is formed in the bag 10 within the perimeter of the fixed end 20 of the sleeve 19, and a member that may be ruptured or blown out by pressure of the air in the bag 10, such as a disc 26, is secured between the inner surface of the bag and the end of the sleeve 19 adjacent the opening 25 to prevent air from exhausting from the bag prior to its escape through the valve member as hereinafter described.

As shown in Fig. 1 a pneumatic inflation assembly, shown generally at 28, communicates with the container or bag 10 and is adapted to effect inflation of the container or bag. The assembly comprises a gas or air pneumatic storage cylinder 29 and a suitable on-and-off valve 30 of a type well known in the art. The inflation assembly 28 may be mounted directly on the container 10 or may be mounted on a base member (not shown) which extends from the platform 11. It is to be understood, of course, that the container 10 may be inflated in various other ways, the inflation assembly 28 being shown only by way of example.

In operation, the supply load 13 is fastened on the platform 11, or a missile is fastened directly to one, or a plurality of, bags 10, by the fastening means 14. The bag 10, at this time, is in the deflated condition, and the base plate 12, if used, is drawn up in stowed position. The parachute 15 may be attached in the folded condition to the fastening means 14 any time before the load is cast from the aircraft. When the load is cast from the aircraft, inflation means such as the inflation assembly 28 shown mounted on and connected to the bag 10 is automatically or manually set in operation by actuating the valve 30 to inflate the bag. If the parachute 15 is used, it opens as the load descends to retard the rate of descent of the load. Before the load is cast from the airplane, the sleeve 19 is disposed within the bag 10 and assumes approximately the position shown in Fig. 2 of the drawing.

At the instant of impact of the bag 10 or base plate 12 with a supporting surface, such as the earth's surface, the falling load tends to compress the bag and thereby increase the pressure of the air within the bag. Before the pressure within the bag becomes excessive, the disc 26 blows out or ruptures and the air exhausts from the bag thereby forcing the sleeve 19 from the inside of the bag through the opening 25 to a position outside the bag as shown in Fig. 3 of the drawing. The sleeve 19 in this position tends to retard, and control and regulate, the flow of air from the bag, as hereinafter described. As the load continues to descend and the air within the bag tends to be further compressed, the elastic band 23 expands outwardly to increase the area of the orifice opening 24 thereby tending to prevent the air within the bag from being further compressed. The sleeve 19 at this time tends to assume the position shown in full in Fig. 3.

As the velocity of the descending load decreases, the compression of the air in the bag 10 tends to decrease thereby permitting the elastic band 23 to contract and decrease the area of the orifice opening 24. Restricting the area of the orifice opening 24 tends to retard the flow of air from the bag thereby increasing the decompression period and preventing too rapid a fall near the end. The pressure of the air within the bag is thereby regulated so that it neither reaches a high peak at the beginning, nor falls too rapidly near the end, thus tending to reduce the initial impact shock to a minimum and provide a smooth uniform deceleration of the load.

I claim:

1. An impact absorption device for a falling load, comprising: an inflatable container adapted to underlie the load when inflated, the container having an opening for exhausting air from the interior thereof; a valve member comprising a flexible sleeve fastened at one end to the container at the opening and having a variable area orifice at the other end; and means associated with the opening for retaining the sleeve within the container and preventing air from exhausting from the container during descent of the load, the said means being adapted to release air from the container and permit the sleeve to be forced through the opening to the outside of the container to vent the interior of the container to atmosphere through the variable area orifice when the container contacts a supporting surface, the variable area orifice controlling the flow of air from the container to reduce the impact shock and provide a gradual deceleration of the load.

2. An impact absorption device for a falling load, comprising: an inflatable container adapted to underlie the load when inflated, the container having an opening for exhausting air from the interior thereof; a valve member for controlling the air flowing through the opening, the valve member comprising a sleeve of resilient material fastened at one end to the container at the opening and forming a variable area orifice at the other end; and frangible means associated with the opening for retaining the sleeve within the container and preventing air from exhausting from the container during descent of the load, the frangible means being adapted to rupture when the container contacts a supporting surface to release air from the container and permit the sleeve to be forced through the opening to the outside of the container to vent the interior of the container to atmosphere through the variable area orifice, the area of the orifice expanding in response to increasing pressure and contracting in response to decreasing pressure of the air so as to reduce the impact shock and provide a gradual deceleration of the load.

3. An impact absorption device for a falling load, comprising: an inflatable container adapted to underlie the load when inflated, the container having an opening for exhausting air from the interior thereof; a valve member for controlling the air flowing through the opening, the valve member comprising a flexible sleeve fastened at one end to the container at the opening and having a variable area orifice of resilient material formed at the other end; and a sheet of frangible material covering the opening to retain the sleeve within the container and prevent air from exhausting from the container during descent of the load, the sheet being adapted to rupture when the container contacts a supporting surface to release air from the container and permit the sleeve to be forced through the opening to the outside of the container to vent the interior of the container to atmosphere through the variable area orifice, the area of the orifice expanding in response to increasing pressure and contracting in response to decreasing pressure of the air so as to reduce the impact shock and provide a gradual deceleration of the load.

4. An impact absorption device for a falling load, comprising: an inflatable container adapted to underlie the load when inflated, the container having an opening for exhausting air from the interior thereof; a valve member for controlling the air flowing through the opening, the valve member comprising a flexible sleeve having one end fastened to the container at the opening and including an elastic member associated with the other end to form a variable area orifice; and a sheet of frangible material covering the opening to retain the sleeve within the container and prevent air from exhausting from the container during descent of the load, the sheet being adapted to rupture when the container contacts a supporting surface to release air from the container and permit the sleeve to be forced through the opening to the outside of the container to vent the interior of the container to atmosphere through the variable area orifice, the area of the orifice expanding in response to increasing pressure and contracting in response to decreasing pressure of the air so as to reduce the impact shock and provide a gradual deceleration of the load.

5. An impact absorption device for a falling load, comprising: a load supporting platform member adapted to be attached to the load; an inflatable container secured to the underside of the platform member, the container having an opening for exhausting air from the interior thereof; a valve member for controlling the air flowing through the opening, the valve member comprising a flexible sleeve having one end fastened to the container at the opening and including an elastic member associated with the other end to form a variable area orifice; and a sheet of frangible material covering the opening to retain the sleeve within the container and prevent air from exhausting from the container during descent of the load, the sheet being adapted to rupture when the container contacts a supporting surface to release air from the container and permit the sleeve to be forced through the opening to the outside of the container to vent the interior of the container to atmosphere through the variable area orifice, the area of the orifice expanding in response to increasing pressure and contracting in response to decreasing pressure of the air so as to reduce the impact shock and provide a gradual deceleration of the load.

6. An impact absorption device for a falling load, comprising: a load supporting platform member adapted to be attached to the load; an inflatable container secured to the underside of the platform member, the container having an opening for exhausting air from the interior thereof and a base member for absorbing abrasion forces when the container contacts a supporting surface; inflating means communicating with the container for effecting inflation of said container; a valve member for controlling the air flowing through the opening, the valve member comprising a flexible sleeve having one end fastened to the container at the opening and including an elastic member associated with the other end to form a variable area orifice; and a sheet of frangible material covering the opening to retain the sleeve within the container and prevent air from exhausting from the container during descent of the load, the sheet being adapted to rupture when the container contacts a supporting surface to release air from the container and permit the sleeve to be forced through the opening to the outside of the container to vent the interior of the container to atmosphere through the variable area orifice, the area of the orifice expanding in response to increasing pressure and contracting in response to decreasing pressure of the air so as to reduce the impact shock and provide a gradual deceleration of the load.

7. An impact absorption device for a falling load comprising: a load supporting platform member having fastening means for attaching the platform to the load; descent retarding means attached to the fastening means for retarding the rate of descent of said load; an inflatable container secured to the underside of the platform member, the container having an opening for exhausting air from the interior thereof and a base member for absorbing abrasion forces when the container contacts a supporting surface; inflating means communicating with the container for effecting inflation of said container; a valve member for controlling the air flowing through the opening, the valve member comprising a flexible sleeve having one end fastened to the container at the opening and including an elastic member associated with the other end to form a variable area orifice; and a sheet of frangible material covering the opening to retain the sleeve within the container and prevent air from exhausting from the container during descent of the load, the sheet being adapted to rupture when the container contacts a supporting surface to release air from the container and permit the sleeve to be forced through the opening to the outside of the container to vent the interior of the container to atmosphere through the variable area orifice, the area of the orifice expanding in response to increasing pressure and contracting in response to decreasing pressure of the air so as to reduce the impact shock and provide a gradual deceleration of the load.

References Cited in the file of this patent

UNITED STATES PATENTS

| | | |
|---|---|---|
| 2,712,913 | Stanley | July 12, 1955 |
| 2,713,466 | Fletcher | July 19, 1955 |
| 2,721,048 | Warden | Dec. 18, 1955 |
| 2,774,560 | Johnson | Oct. 18, 1956 |
| 2,781,058 | Warhus | Feb. 12, 1957 |
| 2,840,194 | Mitchell et al. | June 24, 1958 |